(12) United States Patent
Richter et al.

(10) Patent No.: US 8,665,077 B2
(45) Date of Patent: Mar. 4, 2014

(54) CIRCUIT FOR SELECTIVELY PRODUCING SWITCHING SIGNALS, ESPECIALLY FOR A VEHICLE DOOR LOCKING, A VEHICLE, SYSTEM AND METHOD EQUIPPED THEREWITH FOR PROTECTING AREAS OF RISK AS WELL AS A SYSTEM, SYSTEM COMPONENTS AND METHOD FOR HERMETICALLY TRANSFERRING VALIDATABLE DATA

(75) Inventors: Wolfgang Richter, Germering (DE); Stefan Donat, München (DE); Peter Rosenbeck, Gauting (DE)

(73) Assignee: Ident Technology AG, Wessling (DE)

( * ) Notice: Subject to any disclaimer, the term of this patent is extended or adjusted under 35 U.S.C. 154(b) by 1853 days.

(21) Appl. No.: 10/524,933

(22) PCT Filed: Aug. 18, 2003

(86) PCT No.: PCT/EP03/09136
§ 371 (c)(1),
(2), (4) Date: Apr. 14, 2006

(87) PCT Pub. No.: WO2004/078536
PCT Pub. Date: Sep. 16, 2004

(65) Prior Publication Data
US 2006/0261672 A1    Nov. 23, 2006

(30) Foreign Application Priority Data

| Aug. 15, 2002 | (DE) | 102 38 134 |
| Feb. 10, 2003 | (DE) | 103 05 341 |
| Feb. 10, 2003 | (DE) | 103 05 342 |
| Apr. 8, 2003 | (DE) | 103 15 845 |

(51) Int. Cl.
*B60Q 1/00* (2006.01)
*B60L 1/00* (2006.01)

(52) U.S. Cl.
USPC ............................... 340/425.5; 307/10.1

(58) Field of Classification Search
USPC ............... 340/426.16, 5.2; 307/149
See application file for complete search history.

(56) References Cited

U.S. PATENT DOCUMENTS

| 4,237,421 A | 12/1980 | Waldron | 327/517 |
| 4,591,854 A | 5/1986 | Robinson | 340/5.65 |

(Continued)

FOREIGN PATENT DOCUMENTS

| DE | 60109088 T2 | 4/2006 | B60R 25/00 |
| EP | 0802500 B1 | 8/1999 | G06K 11/16 |

(Continued)

*Primary Examiner* — Brian Zimmerman
*Assistant Examiner* — Cal Eustaquio
(74) *Attorney, Agent, or Firm* — King & Spalding L.L.P.

(57) ABSTRACT

The invention relates to a circuit for selectively producing switching signals, in particular signals used for locking vehicle doors, a vehicle provided with said circuit, a system and method for protecting areas of risk and a system, components and method for hermetically transferring validated data. For automotive engineering, it is desired that certain switching processes in or outside the vehicle like the opening of a door, the actuation of a start button or the activation of a parking brake be carried out exclusively by a driver. The aim of said invention is to develop the solutions which make it possible to advantageously produce distinctive signals for coordinating a switching process. For this purpose, the inventive method for generating switching signals consists in producing said signals according to the selective activation of a switching device by a user. The inventive circuit is characterized in that the device signal is emitted towards the user and is transmitted by the user during the actuation of the switching device. The switching signal is produced by said device.

13 Claims, 9 Drawing Sheets

(56) References Cited

U.S. PATENT DOCUMENTS

Figure 1:
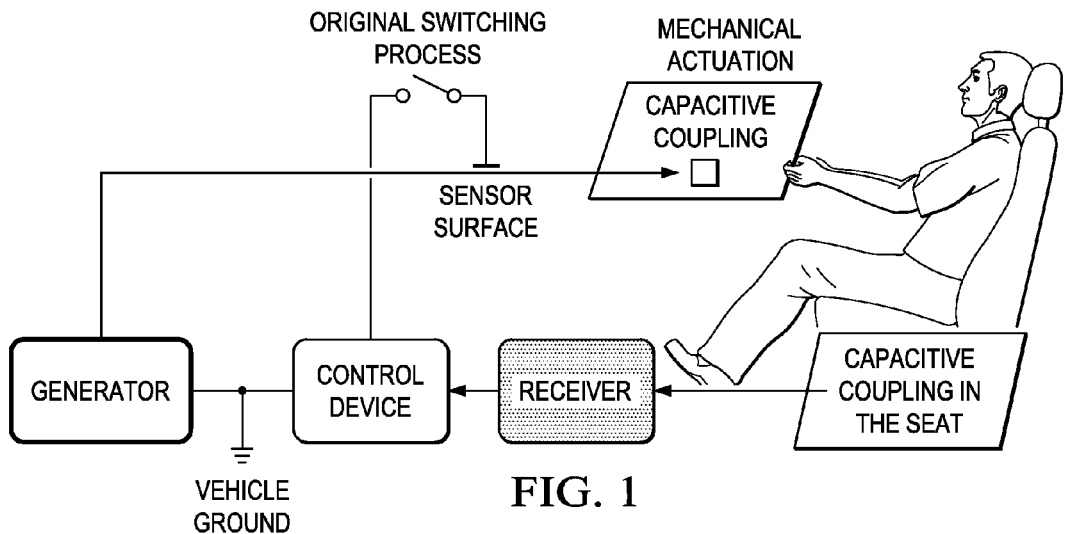

| | | | |
|---|---|---|---|
| 5,796,827 A | 8/1998 | Coppersmith et al. | 713/182 |
| 5,811,897 A * | 9/1998 | Spaude et al. | 307/149 |
| 6,771,161 B1 * | 8/2004 | Doi et al. | 340/5.64 |
| 6,992,565 B1 | 1/2006 | Giesler | 340/5.72 |
| 2003/0025588 A1 * | 2/2003 | Meier et al. | 340/5.2 |
| 2004/0056758 A1 * | 3/2004 | Schwartz | 340/5.2 |

FOREIGN PATENT DOCUMENTS

| | | | |
|---|---|---|---|
| EP | 1198063 A1 | 4/2002 | H03K 17/96 |
| EP | 1045947 B1 | 1/2005 | E05B 49/00 |
| EP | 1530526 B | 10/2008 | |

* cited by examiner

DISTANCE BRIDGING BY MEANS OF SO CALLED "SNIFFERS"

CIRCUIT FOR SELECTIVELY PRODUCING SWITCHING SIGNALS, ESPECIALLY FOR A VEHICLE DOOR LOCKING, A VEHICLE, SYSTEM AND METHOD EQUIPPED THEREWITH FOR PROTECTING AREAS OF RISK AS WELL AS A SYSTEM, SYSTEM COMPONENTS AND METHOD FOR HERMETICALLY TRANSFERRING VALIDATABLE DATA

CROSS REFERENCE TO RELATED APPLICATIONS

This application is the US national phase of PCT application PCT/EP2003/009136, filed 18 Aug. 2003, published 16 Sep. 2004 as WO 2004/078536, and claiming the priority of German patent application 10238134.8 itself filed 15 Aug. 2002, German patent application 10305342.5 itself filed 10 Feb. 203, German patent application 10305341.7 itself filed 10 Feb. 2003, and German patent application 10315845.6 itself filed 8 Apr. 2003.

FIELD OF THE INVENTION

The invention relates to a switching arrangement for the selective switching signal generation and a vehicle equipped therewith. In addition, the invention relates as well to a method for the selective generation of a switching signal, especially for controlling functional components of a motor vehicle.

In the field of vehicle technology, it is desirable to be able to ensure that certain switching processes in or on a vehicle, like for example the opening of the vehicle doors, the actuation of a starting button, or the release of a parking brake, can only be carried out by the vehicle operator. The radio transmission system hitherto used for these purposes rely on concepts which are expensive, cost intensive and in part not sufficiently reliable.

The invention has as its object to provide a solution which enables the generation of switching signals which are decisive for the coordination of switching procedures in an advantageous manner. This object is achieved according to a first aspect of the invention by a method of making available switching signals in which each switching signal is generated depending upon whether a switching device has been selectively actuated by a user, whereby this switching arrangement is characterized by the fact that in the framework of the actuating of the switching device an enablement or set-up signal is coupled into the user and transmitted through the user and that based upon the enablement signal coupled to the user, the switching signal is generated.

In this way it is possible advantageously to provide functionally freely installable switching devices at desired ergonomically advantageous locations and to have an improved assurance of satisfaction of the respective requirements for operation of them. In an advantageous manner, this system provides a significantly reduced cabling expense by comparison with conventional concepts. Advantageously, a number of switching devices can be provided whereby the switching devices are so configured that in an interplay with a contacting thereof, signal sequences or signals with different information contents can be generated. Advantageously, the enablement signal is transmitted through the user to a central detection zone. This central detection zone can, in the case of a motor vehicle application, be for example a vehicle steering wheel or a seating surface electrode to which a corresponding signal evaluation unit can be coupled.

In an advantageous manner, a plurality of switching devices are provided, whereby each switching device generates a switching-unit-specific enablement signal. In this manner it is possible to effect the signal transmission, teach selectively, for example by contacting the selected switching device with he index finger.

The enablement signal is preferably coupled into the user on the basis of the electrical field interaction effect.

The enablement signal contains a data telegram. The data telegram can, on the one hand, serve to identify the switching device and on the other hand can contain information as to the type of actuation of the switching device. It is possible to provide zones on or of the switching device which supply different information inputs in the switching signal generated by means of the switching device. Thus it is possible, for example, for a temperature control by the switching device to provide graphic, especially a color-marked switching region whereby in the switching region, the location dependent, for example a signal content varying from left to right, can be contained in the enablement signal. This signal content can be contained as a high frequency component in the enablement signal as a data telegram or, for example, can be defined in the enablement signal in the form of a pulse spacing.

It is possible in the region of the switching device to provide a rotary knob so that the enablement signal is generated as a function of the actuation of this knob, that is the rotation of the knob is required for producing the enablement signal. The enablement signal generated as a result of the rotation of the rotary knob can be transmitted during the actuation of the knob through the user by virtue of the contact of the user with the know during that rotation.

It is possible, through a user-side key device carried close to the body, to influence the switching signal generation further, especially by generating a key signal which is also coupled into the user. The switching signal can be generated depending upon whether the key device is present in the region of the user and/or provides a specific signal pattern. Thus it is possible to only generate certain switching signals when the user is in a certain region, for example, is on the vehicle seat and carries a key device, for example in the form of a check-cashing card or the like.

It is possible to carry out with this key device an intermediate signal processing so that at least a part of the enabling signal coupled into the user on behalf of the switching device is processed in the region of the key device and the evaluation result thus obtained is outputted to a data telegram on behalf of the key device, for example, as picked up through a seating surface electrode or steering wheel electrode.

The system can be so constructed that by contact of the switch device by the user, an oscillation system is coupled to it through the switch device and means can then be provided which detects whether the user is coupled with this oscillation system and that depending upon whether the coupling with the oscillation system has occurred, enables the switching signal to be generated. The system capable of oscillation can be coupled with the user preferably over a sufficiently intensive touch contact or sufficient proximity to the body of an electrode device, utilizing a capacitive effect.

Preferably a signal event is coupled to the user capacitively and depending upon the event absorption property, he switching signal can be generated. The signal device can form a modulated signal drop. The modulation of the drop or depression can be switching unit specific. In addition, the modulation of the drop can be effected depending upon the signal content of the signal event coupled into the user.

The object of the invention stated at the outset can also be achieved by a switching system for producing switching signals in which each switching signal is generated depending upon whether a switching device has been selectively actuated by a user, this system being distinguished in that the switching device is so configured that in the framework of the actuation of the switching device, an enabling signal is coupled into the user and transmitted through the user to a detection zone, and the detection zone is coupled with a switching signal generator so configured that it produces the switching signal based upon the enabling signal coupled into the user.

The switching device has advantageously at least one switch contact zone. With it, it is possible to produce a switching state change and a signal indicating the desired switching state change. The switching device can also be a plurality of switch contact zones. In that case it is possible to generate switching signals which, for example in an adjustment region will enable, for example, a switching state selection. The switching device can comprise sensor surfaces or also manually actuatable switch means, for example rotating knobs, whereby depending upon the manual actuation of the switch means each manual actuation can generate a specific enabling signal which can be coupled into the user.

The switch device is for example in the form of a plug-like or adhesively applicable switch means with an integrated coding surface in the dashboard or instrument panel region or also on a switching lever.

The invention also extends to a switching system for producing switch signals in which each switch signal is generated depending upon whether in the region of a switch device provided in the vicinity of the external field of a user has been selectively actuated by the user, the system being distinguished in that the switching device is so constructed that in the framework of actuation of the switching device an enabling signal is coupled into the user and through the user is transmitted to a detection zone and the detection zone is coupled with a switching signal generator so configured that it generates the switching signal on the basis enabling the signal coupled into the user.

In an advantageous manner with this system the user or operator can be identified in that he or she may be the individual seated on a specific seating surface and is incorporated in he circuit. For this purpose weak signals can be applied vi the switch and through the actuating (index) finger and the body of the user in the seat. This is achieved advantageously capacitively with alternating current voltage signals.

A First Simple Function Principle

A switch or a sensor button or key is connected with a terminal of a signal source which feeds a frequency in the kilohertz range into the switch or sensor button. In the seat of the operator there is a conductive surface which can pick up the signal when the operator contacts the switch and the signal is transmitted (capacitively) through his finger and to his skin in a so-called body bridge. This forms then the capacitive counter surface to the seat. A heating foil already provided in the seat can be used for example as the receiving surface. A receiver connected thereto selects the thus supplied signal. In addition, the switching fulfills its ordained function.

The invention relates according to a further and second mode of the invention also to a switching device for a vehicle door lock and the vehicle to be equipped therewith. In addition, the invention also concerns the method for the selective locking or unlocking of a door of the vehicle.

It is known to provide mechanical lock devices for motor vehicles in which the motor vehicle doors can be locked or unlocked by means of a key. As an alternative to mechanical lock devices or to complete a description of the locking devices for motor vehicles, note can be taken of switch arrangements in which motor vehicles which can lock or unlock the driver door or, through a central locking system all of the vehicle doors by remote control. This remote control is usually effected through a mobile key unit carried by the vehicle user and operating by electromagnetic or optical means. It is possible between the key unit and the electrical components provided on the vehicle side to provide a bidirectional signal exchange so that for each locking process or unlocking process different signals or data telegrams are provided to achieve an especially high coding reliability.

The remote control systems which have meanwhile become available on the market enable control in part of the vehicle side switching arrangement over large distances. There are also switching devices known which upon the approach of a vehicle user equipped with a corresponding key unit to the vehicle will automatically allow unlocking of the vehicle doors and by unlocked spacing of the lock unit from the region of the vehicle will cause a locking of the vehicle. Locking systems so configured have the advantage that for opening or closing the motor vehicle the corresponding key unit can remain, for example, in a garment pocket and need not be withdrawn to open or close the vehicle. On the other hand with this locking system there is the problem that already upon approach of the key carrier to the motor vehicle, an unlocking process will be triggered even when this is not desired.

The invention has, in connection with this situation, the object of providing a solution whereby based upon the respective actuation intention of the key carrier, corresponding functions of the vehicle lock system can be achieved without requiring special manipulation of the key device.

This object is achieved according to the invention by a switch arrangement for a vehicle door lock, for generating a switch signal for the selective locking and/or unlocking of a vehicle door, comprising a signal processing device provided on the vehicle side for processing an input signal of a switching signal output unit for controlling a door lock device based upon an evaluation result of the signal processor unit, a signal receiving unit in signal communication with the signal processing unit on he vehicle side for detecting or acquiring an input signal of a mobile key device with a key code generating unit for generating a key data sequence and a key signal output unit for transmitting the key data sequence in the receiving region of the vehicle side receiving unit. The system is characterized in that the signal receiving unit has a receiving element for picking up an input signal upon contact of a vehicle side component through the carrier of the mobile key device or unit.

In this manner it is possible advantageously, in he context in the opening or closing of a vehicle door, to carry out a signal exchange between a corresponding person and a the motor vehicle by contact so that an undesirable switching function can be precluded in a convenient manner.

Especially in conjunction with the opening of the vehicle door, it is possible to trigger the vehicle door locking system into an unlocking state directly by contact for example with the vehicle grip.

It is possible to so configure the vehicle locking system that it, after the closing of all vehicle doors, enables basically a locking state to be created whereby this locking state can be temporarily lifted when a correspondingly configured door grip device of the vehicle is contacted by a person equipped with a key device according to the invention.

According to an especially preferred embodiment of the invention, the mobile key device comprises a coupling unit or element for coupling a detectable event into the key device carrying person and which is detectable by the vehicle side circuit components or switch components.

The coupling of this event is effected preferably in a capacitive manner in that the key device is sufficiently close to the body of the person, for example is worn in a trouser or shirt pocket.

The coupling element can thus be configured as an electrode circuit which for example extends on a housing uni of the key device. The event coupled to the carrier of the key device preferably contains a data telegram. This data telegram can be formed by corresponding modulation of the field generated by the coupling device.

The data telegram can be so configured, with respect to this information content, that it enables the actuation of the switching signal output device and this enables the unlocking or optionally also the locking of the motor vehicle.

Alternatively to this feature it is also possible through the switching process originating with the switching or circuit components provided on the vehicle side to make the transmitted signal additionally, for example, transmissible by an electromagnetic, acoustic or optical path.

It is especially possible to integrate in the mobile key device a Bluetooth module which can enable a desired additional data exchange to be carried out. It is possible to so equip the key device that it can selectively be operable in different, security modes.

According to a further aspect of the present invention, it is also possible within the framework of the physical contact between the carrier of the mobile key device and the motor vehicle to effect a signal transmission from the vehicle side components to the mobile key device. Through such a signal coupled to the key device, it is possible to bring the mobile key device into a switching state in which the mobile key device can output a locking or unlocking command.

Through the switching or circuit component arranged on he vehicle as has been described and at least one usable-side transported mobile key device, together forming a system, the locking or unlocking of a vehicle can be so carried out that especially the locking of the vehicle can only be effected following physical contact by the user, especially with a grip device of the vehicle.

The invention comprises, in the framework of a third complex of the invention also system and a method for the securing dangerous regions or preventing dangerous situations from developing. Especially, the invention has the object of detecting the presence or proximity of parts of the body in regions or locations of danger or accident.

Especially in the case of motor-driven accessories in the automotive field like, for example, sliding roof units, seat adjustment units and mechanically actuated vehicle roof or hood units, there is a problem in that a permissible movement of, for example, the seat, roof or hood components require a high degree of force and generally across gap with such large force to progressively reduce this gap. Elements movable with such significant force can cause injury should an object or a part of the body be located in the path because of inattention or the like. Emergency systems for switching off the motor and conventionally used for the problem require actual force applied to the body part before the shutdown can occur. Thus the possibility for example that the finger may be injured by being clamped between a moving part and a stationary part will cause injury before the shutdown will occur is pronounced.

The invention provides a system and a method with the object of advantageously avoiding danger by motor-driven components especially in a gap which may be closed by such components.

This object is achieved according to the invention by a method of detecting the presence or movement of an object in the danger region in which by means of an electrode device, electric field characteristics or an electric field state is determined in the region of danger or a zone ahead of the region of danger and a test procedure is carried out with respect to those properties for that state.

In this manner it is advantageously possible to especially in the case of a movement-gap region or a region ahead of a movement gap, to monitor whether an object moves into or is present in this region. In greater detail, preferably the method of the invention is carried out such that changes in the electrical field characteristics or properties are evaluated in the framework of the testing procedure. It is advantageously possible to provide criteria for test procedure for evaluating the detected electrical field properties which take into consideration different test criteria for different system states.

The test procedure advantageously can take into consideration changes which are position relevant of the electrical field characteristics in the danger zone or a zone ahead of the danger zone. According to a special aspect of the present invention it is possible to detect the electric field characteristics in the danger region or a zone ahead of the danger region based upon the capacitance detection of the electric field system between an electrode device and an adjoining ambient region.

The detected changes in the electrical field properties of the monitored region are preferably intended to determine whether there has been a movement of an object into the monitored region or out of it.

Preferably in the region of the electrode device in the case of the approach of a hand, a mixed frequency is detected in a range of 0.42 to 12 kHz. In this frequency range the presence or movement of a living organism can be detected with a high signal sharpness. He starting frequency or operation frequency of the oscillator is advantageously in the range of 100 to 650 kHz.

According to an especially preferred embodiment of he invention, a plurality of electrode devices are provided whereby preferably by a collective evaluation of the electric field states or changes thereof which are detected, the respective relevant output events are generated.

In an especially advantageous manner, according to a further aspect of the invention, it is also possible to involve the electrode devices in the generation of input signals for a contact sensor system.

The test procedure can be so set up that for different system states different test priorities are established. Thus it is possible, for example, upon reaching a critical gap dimension or drive motor power in certain electrode zones, presence or motion testing will be carried out. In this case it is possible to compensate for aging factors, ambient factors, especially ambient moisture, and to compensate for irrelevant parameters which may confuse the monitoring of the region.

In an especially advantageous manner, the bases for the evaluation results generated by the test procedure can be set up to establish the switching criteria. It is thus possible upon determining the presence of an object in the danger region to lower the speed with which the hood is closed by a hood drive motor or to reduce the mechanism permissible motor speed or to evaluate eh time pattern of the power of the hood drive motor with respect to predetermined switching criteria.

The determination of switching criteria can be so carried out that by detecting an object or a objects movement, for example a hand in the monitored region, a drive force control with greater sensitivity and/or a reduction in the drive speed can be effected.

By the recognition of an object or the movement of an object or the movement of an object, especially a hand or a finger in the monitored region, advantageously an acoustic warning signal can be outputted or a reversal of the drive direction can be triggered.

The activation of the monitoring system can be carried out as a function of selected vehicle operating parameters and/or state parameters of the safety system.

In the case of a system to prevent danger by movement mechanisms, like especially automatic vehicle hoods, the objects already outlined are achieved by a system for detecting the presence or means of an object in a danger region with an electrode device for detecting electrical field properties in the danger region or a zone ahead of it and an evaluation switching or circuit device to evaluate the detected electrical field properties by means of a test procedure.

The evaluation circuit or switching device is preferably so configured that it can evaluate changes in the electric field properties in the framework of the test procedure.

Furthermore, the evaluation circuit or switching device is preferably so configured that the test procedure for different system states utilizes different test criteria or takes into consideration location related changes of the electric field characteristics in the danger region or the zone ahead of it.

The evaluation circuit or switching device can be so configured that the electric field characteristics in the danger region or zone ahead of it are determined based upon a capacitative detection by the electrode device and the adjacent ambient region which together define the electric field system.

The evaluation circuit or switching device is preferably so configured that the detected changes in the electric field characteristics of the monitored region derive from whether there is a movement of an object into and/or out of the monitored region.

The electrode device is advantageously so connected in the monitoring system that it creates a mixed frequency in the monitoring region in the range of 0.42 to 12 kHz upon the approach of a hand thereto.

An especially reliable or convenient monitoring is made possible by providing a plurality of electrode devices.

The electrode devices can preferably also form part of a contact sensing system.

The evaluation circuit or switching device is preferably so configured that the test procedures for different system states provide different test priorities.

The monitoring system can be so configured that before initiating a movement procedure or in conjunction with the commencement of the movement procedure, a system correlation is carried out.

The electrode device is preferably configured as a flat electrode. The electrode device can advantageously be incorporated in a beam structure. This beam structure can be coupled advantageously nonconductively with a vehicle structure or chassis.

The electrode device can in addition also be provided by electrically conductive mesh, wire, seamed or jointed, foil or plate device and/or coating or layered structures.

Preferably a plurality of electrode devices are provided whereby the respective electrode devices each are at least partly self-standing evaluating circuit units or have evaluating circuit units assigned thereto. The evaluating results of these discrete evaluating circuit devices can be collected to a total evaluation.

The invention is thus also advantageously a combination of the previously described features in a fourth invention complex which is a system whose system component and a method for carrying out data transfer for the validation of a transmitter and/or receiver. In addition the invention is concerned with a quasi unidirectional dialogue system for carrying out a data transmission, especially through the human body or at least the proximal ambient region of a user.

With radio-based data transmission systems, there is the problem that because of the spread of radio waves, such that they are not exclusively received by the appropriate receivers, data can be picked up and misused.

Systems which include electromagnetic transponders especially are subject to misuse, particularly when the transponder is spaced significantly from a reading unit which recognizes it. The transponder can then be excited to cause a transmission and that data therefrom can be picked up by a transponder simulator nearby the reading device and which can then cooperate with the true reading device. In this manner it is possible for data sequences to be obtained which will permit improper access or use. The principle of such a range bridging is shown in image 2.

To avoid these problems, so-called challenge/response solutions have been developed. In these systems, between the data transmitter and a reaction unit, bidirectional key words are exchanged. Aside from an expensive method or protocol enabling this data exchange, both the data transmitter and the reaction unit must be equipped with sending and receiving devices and with a control (see image 3).

If the data transmission is initiated prior to the actuation of a pushbutton (for example by a radio-automatic key), the so-called keyless access systems which are today available, the sending receiver operating in the radio range is provided at the reaction device. As a consequence the problem of range-bridging again arises.

For challenge/response systems there is also the problem that a stronger carrier may be emitted from a noise transmitter with the same frequency as the system and thereby limit data transmission. This condition can enable misuse by preventing a user triggered door-locking process so that a passenger might leave the vehicle thinking it has been locked because he is out of range for keyless actuation or has actuated a closing knob. A thief equipped with a suitable hand transmitter which emits a continuous carrier can interfere with the locking process from a distance and then gain access to the vehicle. The affected passenger cannot protect against such a situation since he is unaware that the vehicle is unlocked. A special problem in this connection is that as with other electronic systems, a user or even a third person may be subjected to continuous radio waves which may be detrimental to health.

To reduce the expense and increase the comfort of a remote data transmission, the data can be transmitted through the human body to a receiver by contact or approach of the body to a proximity sensitive receiver. This ensures that a suitable signal transmitter will effect the data transmission at a point in time when it is proximal to the receiver, as guaranteed by a time marking transmitted together with a keying identification number. The receiver must be time-synchronized with the transmitter to enable a unidirectional data transmission and ensure that the code will not in the interim be illegally copied and used at a later point in time at the receiver (time stamp). The advantage of reliable unidirectional data transmission however brings with it the problem of synchronization and the cost associated therewith.

The invention has, in this respect, the object of providing a system, system components thereof, and a method of operating which allows data transfers with high manipulation reliability.

This is achieved by the invention by a data transfer between a master system and a slave system in a manner which enables in the region of the master system the recovery of information as to the slave system based upon signal pickup characteristics thereof. Especially the invention provides a solution in which a data transfer between the master system and the slave system is effected in a capacitive manner, whereby the input impedance of the slave system is modulated with a defined data pattern and this data pattern is detected in the region of the master system during the signal transmission.

In this manner it is advantageously possible to feed back information, especially in the form of a key data sequence in a quasi-hermetically shielded manner to a master system or sending system and to use this key data sequence as the basis for a further data transfer or data exchange signal generation and/or signal validation. Under the term "master system", a system is to be understood in the context that it is in a position to output a signal sequence containing address data. The master system is understood in the context of a system which is in a position to detect a data sequence provided by the master system. It can suffice that the master system or the slave system is equipped with a receiving unit with an input impedance which is modulatable.

Dependin upon the application it is possible to provide circuitry or switching facilities for data processing in the region of the master system or of the slave system.

The objects are achieved, in concrete terms with respect to the data transfer by a method of effecting a data transfer between a master system (transmitter) and a slave system (receiver) in which on the side of the master system a signal event will be transmitted to a receiving region of the slave system and the receiving pickup characteristics of the slave system are modulated in a defined manner and recognized and evaluated on behalf of the master system.

The data transfer is advantageously based upon capacitative interaction effects.

Preferably on the side of the master system, a pilot sequence is emitted and during the input of the pilot sequence, the input impedance of the slave system is modulated based upon the data pattern.

On the side of the master system, preferably the modulated change in the input impedance of the slave system is detected or acquired.

From the modulation pattern acquired by the master system, of the input impedance of the slave system, a data set is generated advantageously and this data set serves as the basis for the information content or for permitting the advance of the data a transfer from the master system to the slave system.

In the region of the master system in an advantageous manner, the data is recovered from the signals obtained from the pickup properties of the slave system and on the basis of which a coding of the further data sent out by the slave system is effected.

In the vicinity of the slave system a time value is taken into consideration in an advantageous manner in the generation of the relevant data pattern for the modulation of the input impedance.

Preferably information content as to the modulation of the input signal in the region of the slave system is taken into consideration with respect to the signal generated on behalf of the master system.

The modulation of the input impedance of the slave system is effected preferably based upon an inverse or retrogressive approach with respect to the coding procedure. The coding procedure determined by the data pattern given by the modulation of the input impedance on behalf of the slave system can in an advantageous manner be configured or correlated on the basis of an information content of a signal sequence outputted on behalf of the master system.

In an advantageous manner a congruence analysis is carried out in the framework of the dialogue pickup initially on he basis of a low coding level, whereby the coding level is then raised. The information used to raise the coding level can be transported at least initially at the low coding level.

Via the master system, as the signal sequence forming the authorization code, depending upon the application a permanent signal, a pulsed signal or a selectively outputted signal may be provided. It is possible to so form the master system that it enables a configuration change of the master system through the signals recovered from the impedance modulation.

The data transfer between the master system and the slave system can be used in an advantageous manner to produce a numerical, alphabetical or value setting or access communication process.

The data transfer between the master system and the slave system can also be used for the development of a process to alter the locking state of a motor vehicle.

The data transfer between the master system and eh slave system can in a further advantageous manner also be used as a clearing signal for the function of a device.

According to an important aspect of the present invention, the data transfer between the master system and the slave system can be used to carry out the presence analysis, to detect equipment perimeter or the input or output of slave-identifying articles.

The invention relates as well to a system for effecting a data transfer with a master system component (transmitter) and a slave system component (receiver) whereby the master system components re so constructed that they are suitable for outputting the signal event in the receiver region of the slave system component and the slave system component is so configured that it enables he modulation in a defined manner of the receiving characteristics, whereby in the region of the master system component, traffic is encountered which detects the change in the receiving characteristics of the slave system component and based upon the detected changes determines the further data transfer.

In addition the invention comprises a master system component for a system as has been described whereby a signal output device is configured as a surface electrode.

This master system component comprises advantageously an electronic signal processing device whereby the signal processing device preferably is connected to a code data storage device.

The master system components can advantageously be received in a base body having the form of check cashing or credit card.

The master system components can form part of a vehicle lock system.

The invention is also directed to a slave system component for a system for the above-mentioned type whereby this has the receiving device for receiving input events on the basis of capacitative interaction effects.

The slave system component comprises in an advantageous manner a receiving device which in the region of a cashier system, a personal traffic region, a sales system or a business, is arranged to enable the operation thereof.

The slave component can also form part of a vehicle door-locking system.

The invention is also directed to a method of changing the locking state of a motor vehicle utilizing a data transfer between a master system (transmitter/key) and a slave system (receiver/vehicle switch component) in which on behalf of the master system, a signal event is transmitted to a receiving region of the slave system and the receiver pickup characteristics are detected and evaluated based upon a defined modulation indicating the pickup characteristics of the slave system by the master system.

The arrangement or operations of the master system and the slave system can also be inverted. The invention therefore also comprehends a method of altering the locking state of a motor vehicle utilizing a data transfer between a master system (key device) and a slave system (vehicle side switching components) in which on behalf of the slave system a signal event is transmitted to a receiving region of the master system and the receiving pickup characteristics of the master system in the form of a defined modulation is picked up and evaluated on behalf of the slave system.

The data transfer is, in an advantageous manner, carried out on the basis of a capacitative exchange effect.

According to a further especially preferred embodiment of the invention in the interior of the vehicle electrode devices re provided for generating or detecting data indicating the location or orientation of the user, especially the driver. These data can be recovered especially from the properties like the transit time and/or intensity of the signals detected by the electrode devices. The electrode devices are preferably located in the region of the beams of the vehicle body, the door side covering, the vehicle hood or roof, the seats, the dashboard, the steering wheel and/or he seat belts.

It is possible from the respective user specific signal to determine the configuration of a user field, especially by determining the configuration of user surfaces or menu structures. Using the signals, a discrimination can be made as to whether a switching function has been initiated by the driver or a passenger. It is possible as a function thereof to determine which user has initiated a switching function or called upon the system or the command for carrying out a switching function.

It is possible through the communications module carried by the user to provide information as to the physiological requirements or the physiological state of the user to thereby make available that information to an on-board system. On the basis of this information, for example, the passenger air conditioning, especially with respect to temperature, humidity and air throughput, as well as seat heating can be controlled. The measured values can be on the basis of body temperature, pulse rate, respiration frequency, step frequency via a certain period of for example each 10 minutes, or other detected events and transmitted, preferably in normalized form, to the on-board system of the vehicle.

According to a further important aspect of the present invention, traffic in the region of the vehicle is detected so that it is possible, in conjunction with the signal coupling to the vehicle according to the invention, to determine whether certain operational states or driver requirements have been fulfilled.

Thus it is especially possible in conjunction with the signal coupling into the person in accordance with the invention to determine whether the driver has both hands on he steering wheel. It is possible to so configure the system that a tiptronic switch state change is only possible when only one hand of the driver is on he steering wheel. The signal coupling into and out of the driver can then for example be through the steering wheel and the shift lever.

Through a multiplexer, various electrodes, especially foil segments can be coupled successively to one receiver. This lets one or more signal transmitters be used in the vehicle. Sensing or pickup points can be seat and contact surfaces (dashboard, central console, trunk space, etc), door beams in the interior as well as door and hood grips on the interior.

Figure 2:
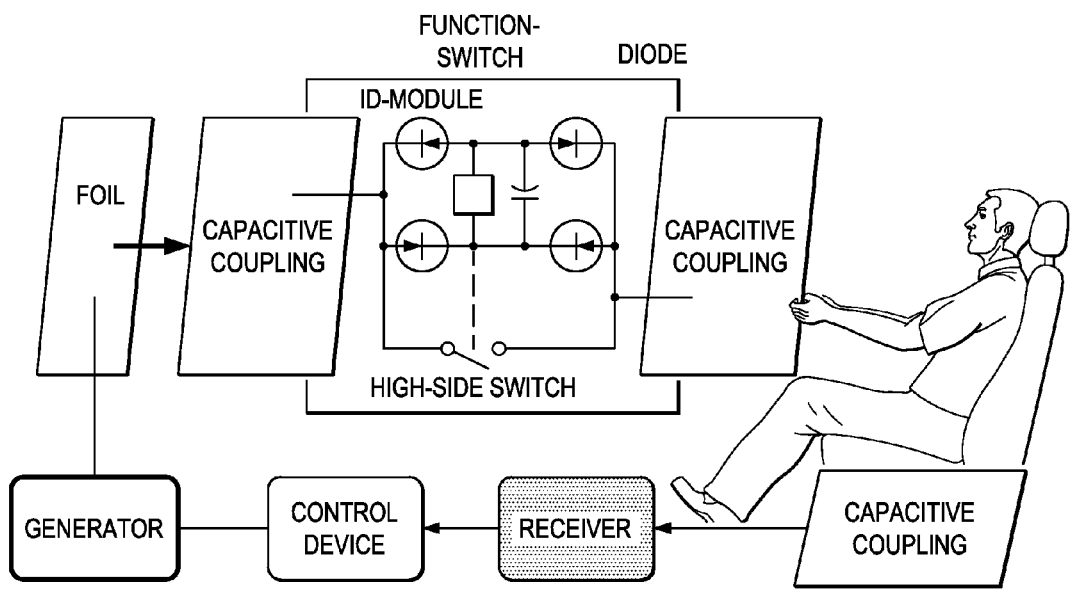
Figure 3:
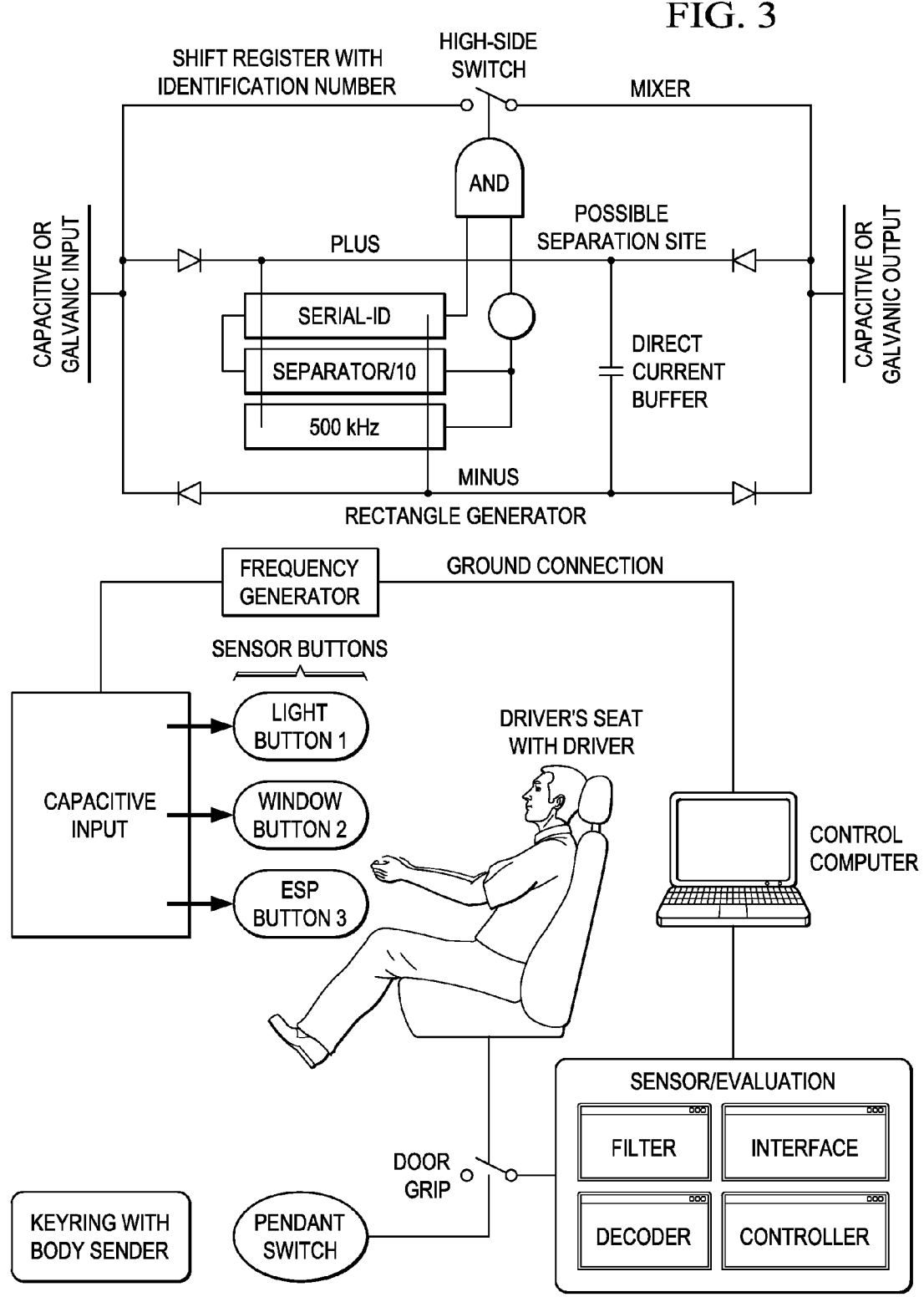
Figure 4:
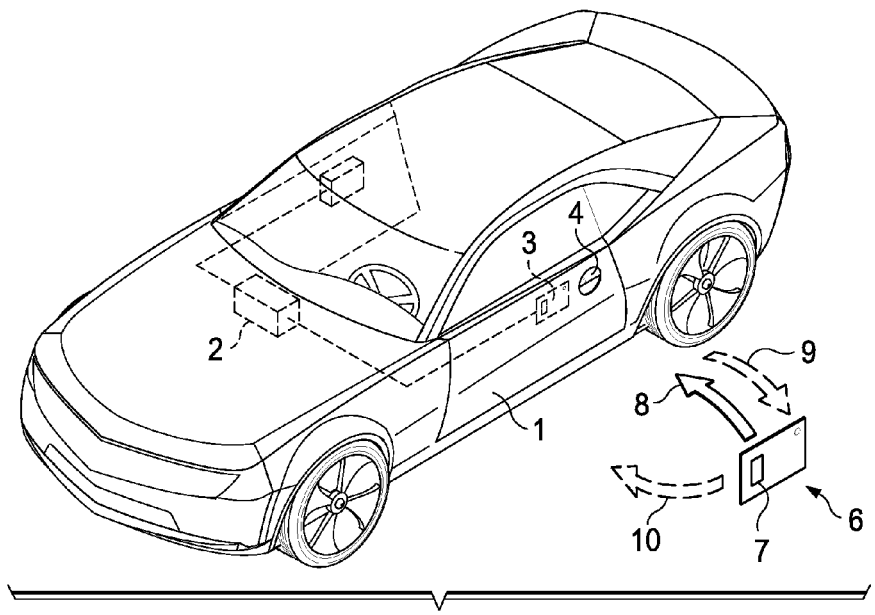
Figure 5:
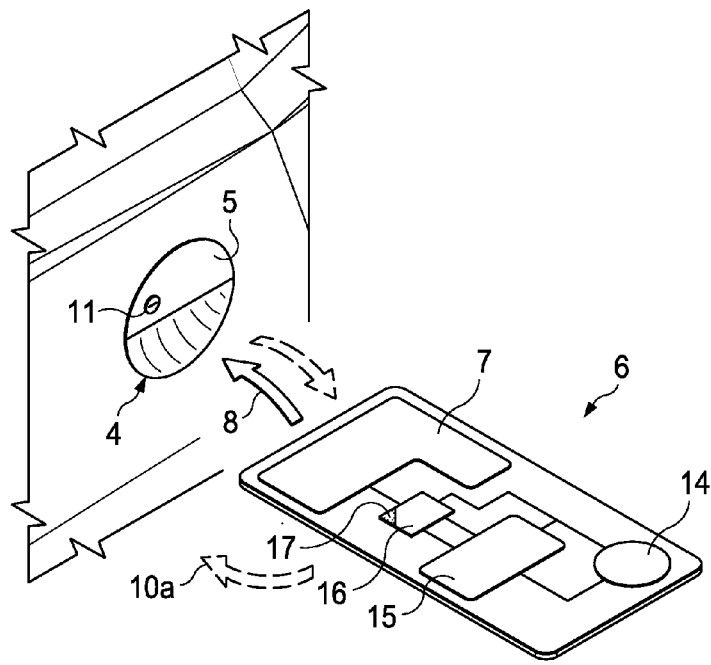
Figure 6:
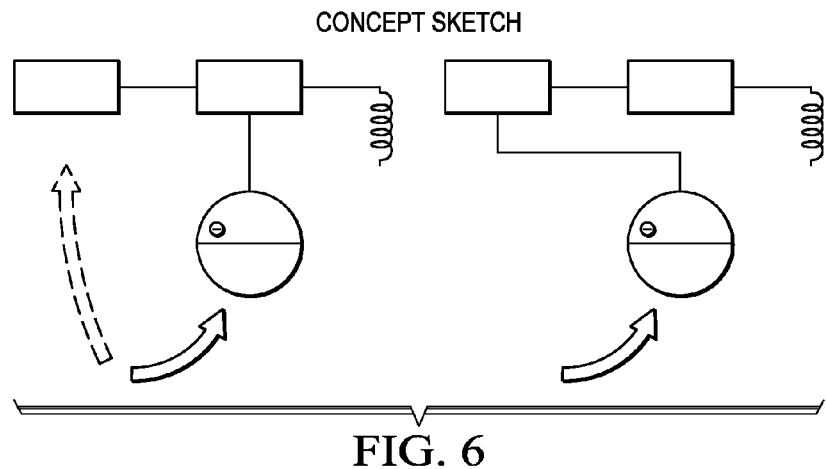
Figure 7:
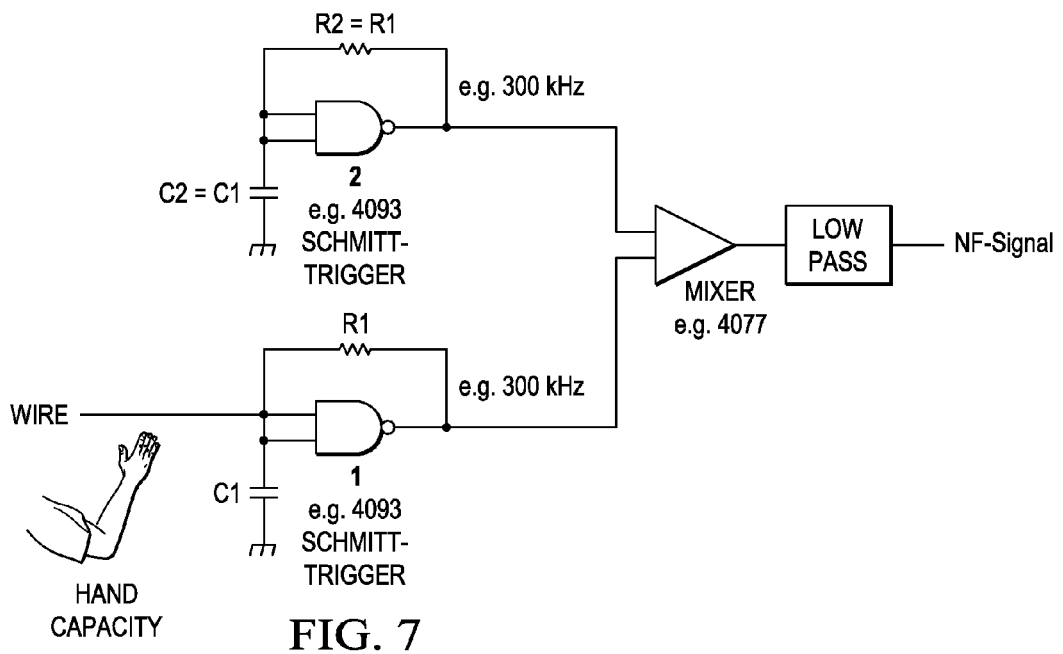
Figure 8:
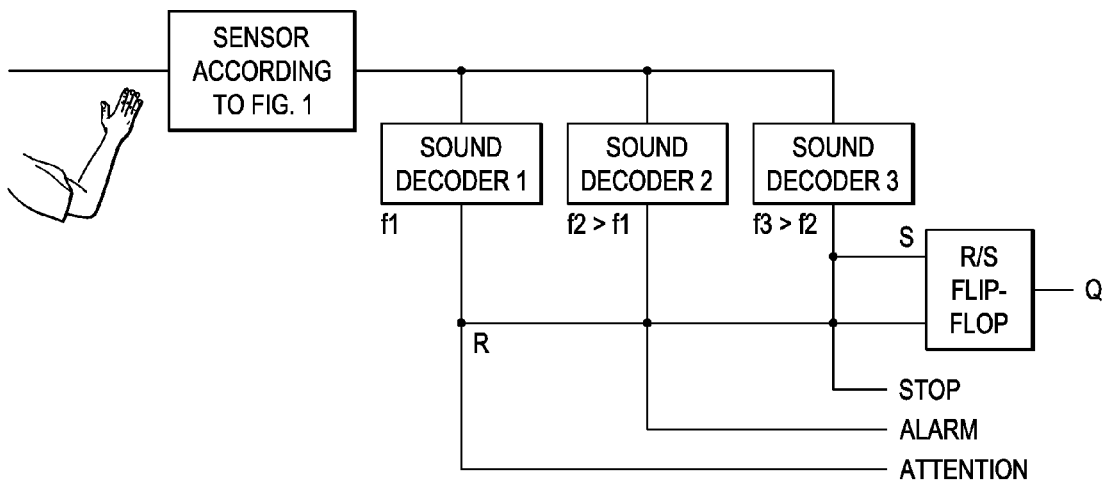
Figure 9:
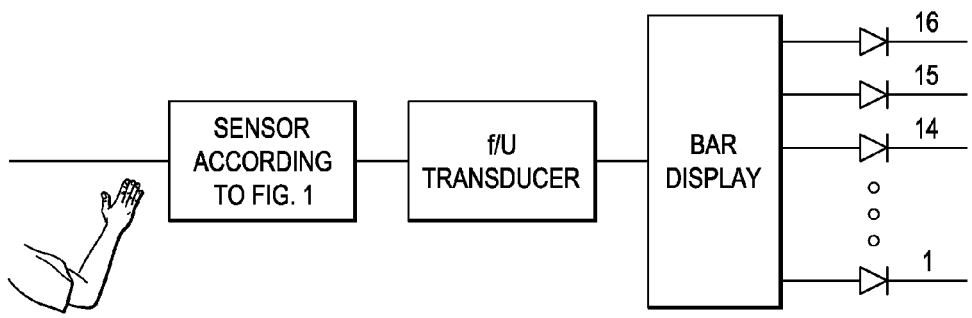
Figure 10:
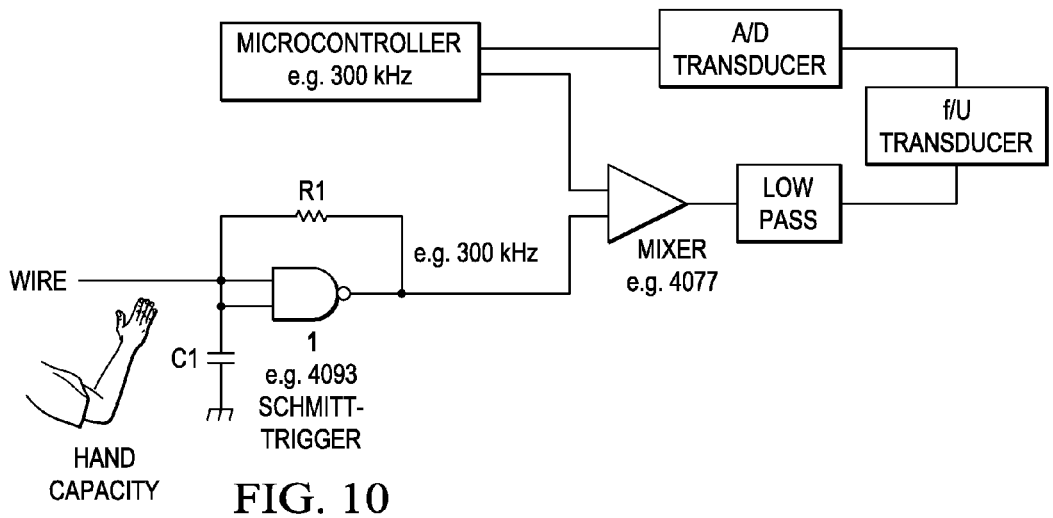
Figure 11:
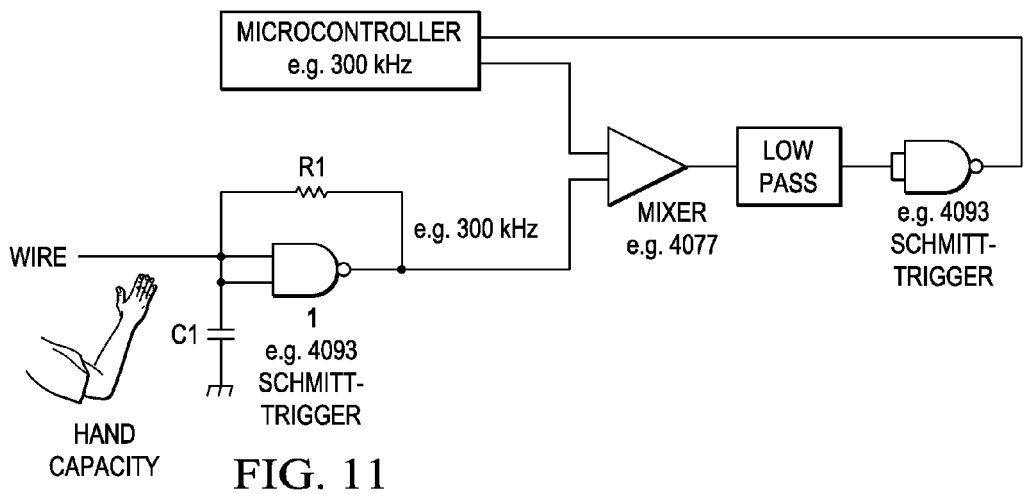
Figure 12:
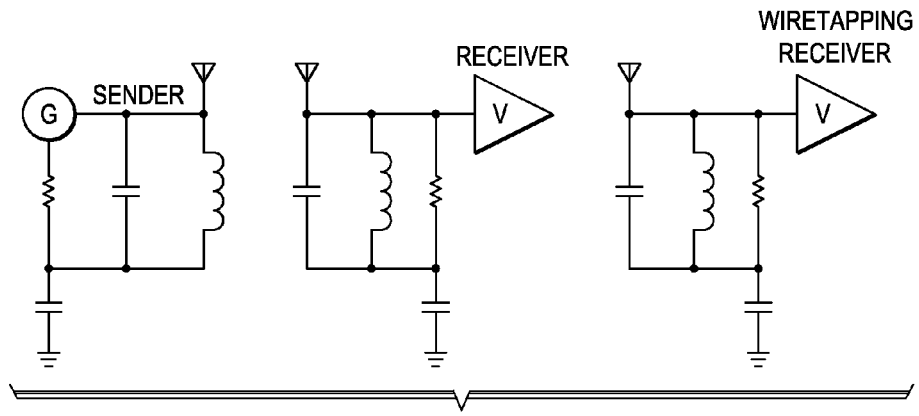
Figure 13:
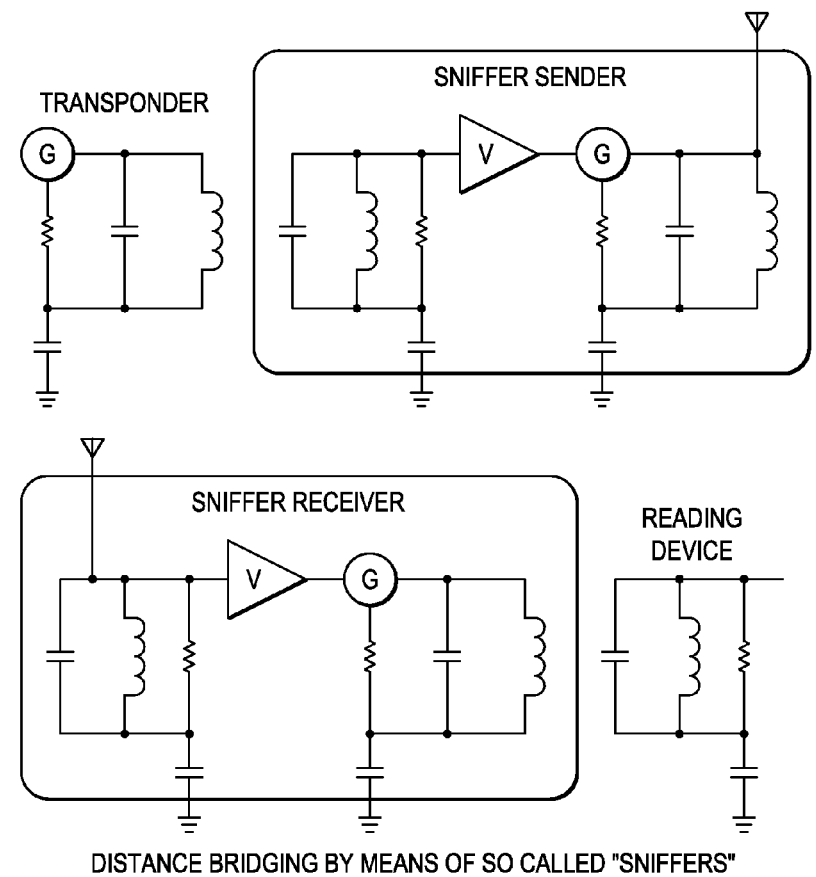
Figure 14:
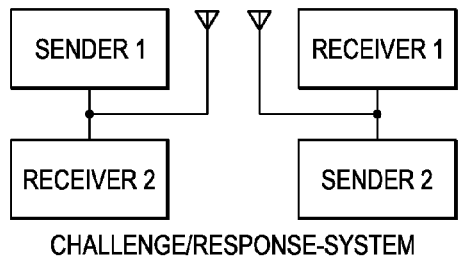
Figure 15:
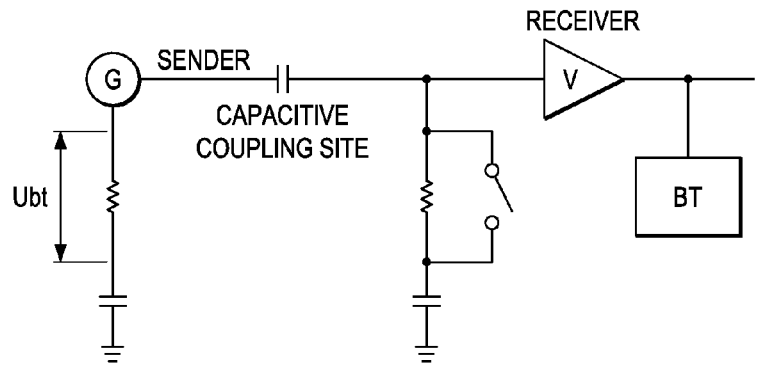
Figure 16:
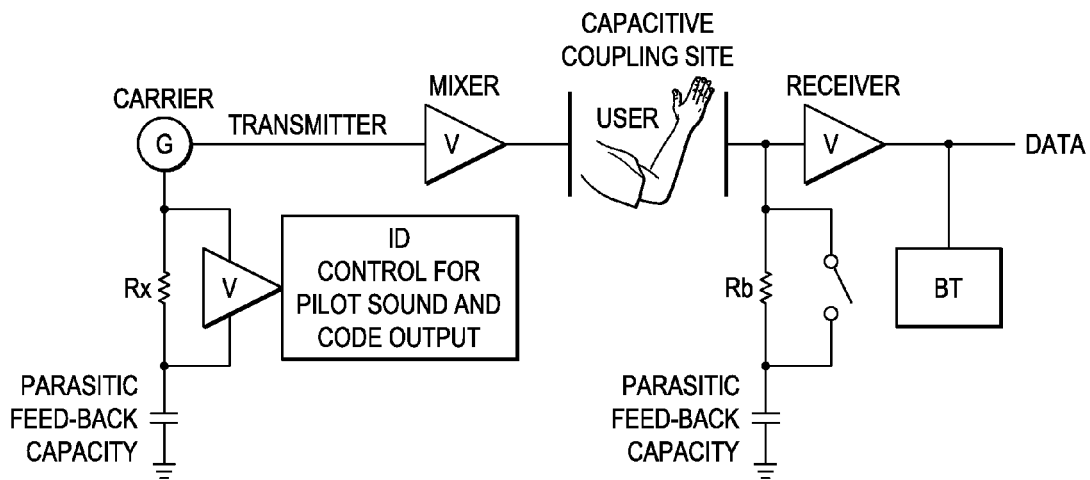
Figure 17:
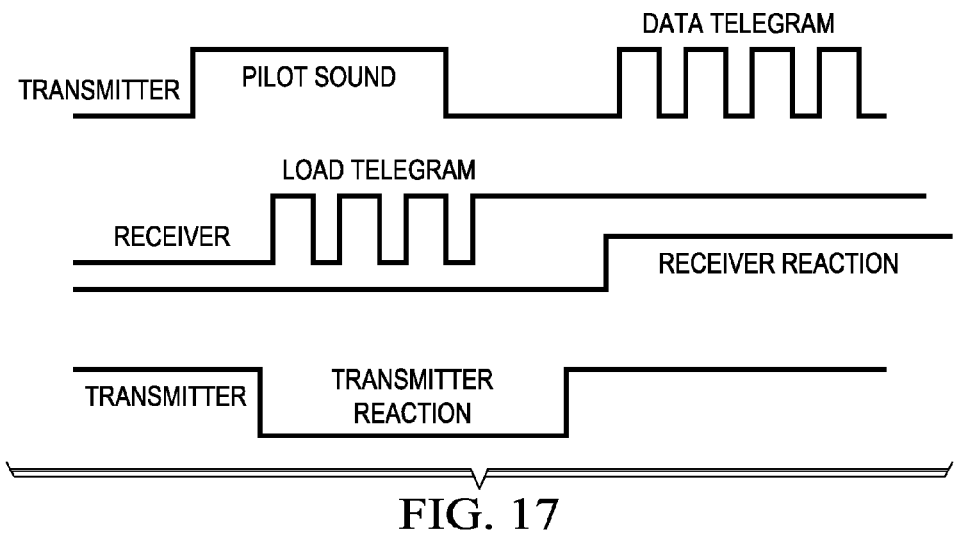
Figure 18:
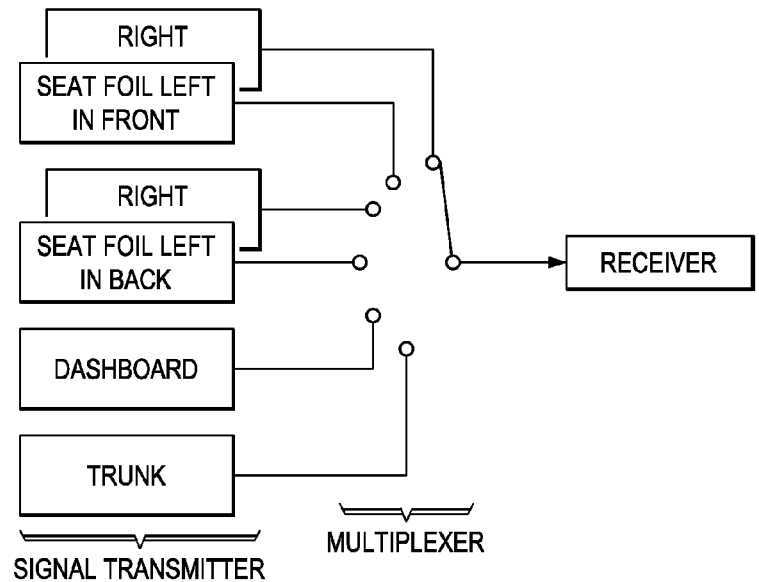

Further details and features of the invention complexes described above and which can be used alone or in combination with one another are given in the following description in combination with the drawing. It shows:

FIG. 1 a schematic illustration to explain a first circuit or switching variant;

FIG. 2 a schematic illustration to explain a first switching or circuit variant;

FIG. 3 a schematic illustration to explain a first circuit or switching variant;

FIG. 4 a perspective view of a vehicle and a user not shown in detail here in he region of a vehicle with a mobile key device;

FIG. 5 a perspective detail view of a vehicle door with a door grip which simultaneously serves as a coupling element for carrying out the signal exchange with the touch contact;

FIG. 6 a simplified perspective view of a mobile key device according to the invention, here in a form of check cashing card or credit card, using arrow symbols to represent incoming and outgoing data telegrams;

FIG. 7 a schematic illustration to explain a first preferred circuit structure for a convertible hood locking;

FIG. 8 a schematic illustration to explain a second preferred circuit structure for a convertible hood or roof lock;

FIG. 9 a schematic illustration for explaining a third preferred circuit layout for a convertible hood or roof lock;

FIG. 10 a schematic illustration to explain a fourth preferred circuit layout for a convertible hood or roof lock;

FIG. 11 a schematic diagram for explaining a fifth circuit layout for a convertible roof or hood lock;

FIG. 12 a data transfer system known per se and comprising a transmitter, a receiver and associated monitoring system enabling unauthorized information pickup;

FIG. 13 an electromagnetic transponder system known per se in which a data transfer between the transponder and the receiving unit allows a miscreant sniffer system to pick up the data transfer;

FIG. 14 a schematic illustration to explain a challenge/response system;

FIG. 15 a schematic illustration for explaining a system according to the invention for creating a hermetic signal feedback by the modulation of the receiving impedance in the region of the receiver;

FIG. 16 a schematic illustration for an explanation in depth of the system of image 4;

FIG. 17 a diagram to explain the operation of the master system (transmitter) and the slave system (receiver);

FIG. 18 a schematic illustration to explain a system utilizing a plurality of electrodes with the intermediary of a multiplexer.

To FIG. 1—Simple Functional Principle

An especially advantageous process according to the invention for identifying the operator is, while he is in a sitting position, is to involve him and his sitting position in the switching process. For that purpose weak signals through the switch are conducted through his actuating (index) finger and the body of the user in his seat. This is achieved capacitatively with an alternating current signal.

A switch or sensor button is connected at one terminal with a signal source which feeds a frequency in the kilohertz range into the switch or sensor button into the switch or sensor button. In the seat of the user there is found a conductive surface which picks up the signal when the user contacts the switch and thus the signal (capacitatively) passes via his finger over his skin in a so-called body bridge. This then forms the capacitive counter surface to the seat. A heating foil already provided in the seat can be used, for example, as the receiving surface. A receiver connected thereto detects the thus fed signal. The switch, apart from this, performs its original intended function.

To FIG. 2:—Expanded Functional Principle

To reduce (wiring) cost and to enable a multiplicity of sensors/buttons/switches to be differentiated, the generator signal is fed to a conductive surface, for example in the dashboard. By contact with such a sensor (through the skin of the user and he seating foil) an alternating current circuit is closed; in he respective sensor, the alternating current is rectified and stored in a condenser. With this dc voltage a register which contains an identification number, bit-wise feeds it to an electronic (high side) switch which varies the loading of the ac circuit. A suitable receiver detects the identification number and conducts it further to the control device which carries out the switching process.

To FIG. 3:

A region of the motor vehicle dashboard is provided on its underside with a conductive foil. Above this surface a plurality of the aforedescribed function generators are provided, for example magnetically attached or adhesively bonded. The function generators all have different identification numbers. Upon contact with a function generator, again through the body bridge of the user, the signal passes from the function generator to the seat and is evaluated in the receiver. When the passenger seat also has a receiver connected to it, for example an actuation of function generators on the central console, for example for light, heating, seat positioning, etc. for the respective occupants (driver or passenger) can be assigned to them. Apart from a reduced installation cost, switches can be spared and the comfort increased.

Practical Side Effects and Further Advantages

The approach of a hand can be detected even before the sensor is contacted so that the sensor can pick up the aura of the frequency of the electrical field of the foil which has been fed by the generator. This can for example be used to illuminate corresponding locations on the dashboard. In addition, the seat positions can be determined for example to switch off the air bag of unoccupied passenger seats. The generator frequency can be used also only as a feeder for the sensor button and can produce upon contact a characteristic frequency which is modulated by the identification code. The sensor buttons can also be operated with gloves. The switch state of the function buttons can be provided within he view of the driver. The function buttons are freely and individually positionable in the region of the feed foil and a positioning of them on the steering wheel is also possible when he feed frequency is applied thereto. Temporary surface buttons can be used by the factory. The signal directions can be also reversed: for example, different frequencies can be outputted from the seating surfaces and by contact through the function buttons and the dashboard to a single receiver. The differentiation as to occupant can then be effected through the feed frequency.

Use Example

The release of an electric hand brake can only be carried out by the user. A head rest can be set to the correct spacing from the back of the head when the aforementioned aura is used. A sales shelf can be provided with such function buttons. Should a customer touch such a button, its identification number through the customer can be contacted to a foil provided in the floor and can result in an electronic product presentation, for example a film of the product can be shown on a display. The actuation of such function buttons also can be fed to a portal through the handy telephone of the actuating consumer who is equipped with a corresponding receiver. In aircraft, the announcement and light systems using this technique can significantly reduce wiring costs.

Improved Alternating Current (ac)

By an LC resonant circuit, levels on and/or as considered at the function button can be increased.

With the switching system according to the invention it is possible, for example, to permit a check change in the transmission ratio (for example on tiptronic shifting) only by a single person who is seated on the driver's seat and optionally carries a mobile key device. Especially in this manner it is possible o provide on a shift lever for example, a signal transfer surface which by touch contact with the hand surface of the driver will enable a data transfer over the body of the driver between the mobile key device and a further vehicle side signal processing unit.

The mobile key device provided in combination with the system of the invention can preferably also transmit data which can be released for example to a user-individual configuration of the vehicle equipment. Thus it is for example possible over the mobile key device to output a user specific code or even complete configuration data so that for example the driver's seat, the mirrors and further devices of the vehicle will automatically be adjusted.

Over the mobile key device, a data set can also be transmitted for an electronic excursion book or for excursion or travel course determinations or for other vehicle side signals processing requirements.

It is possible in the vehicle interior to provide switching surfaces by means of which a signal transfer between he mobile key device and the vehicle side signal processing unit can be carried out. Especially for switching surfaces in the region of the central console of the vehicle it is possible utilizing signal coupling techniques to test the signal generated by the mobile key device at the switching surfaces to determine whether the switching surfaces are being actuated by the authorized user or for example a nonauthorized passenger. It is also possible in the course of signal coupling to test whether an actuation of a switching surface is effected by the driver or a guest. It is possible, for example, for controlling an electric window opener to provide in he region of the central console a switching surface whereby the contact of the switching surface by the driver will operate the driver side window and the contact of the same switching surface by the passenger will operate the passenger side window.

To distinguish whether the driver or someone in a guest seat has actuated a switch or switching surface it is possible independently of the mobile key device to couple a signal into the respective passengers that enables a distinction between them and between them and the driver. This signal coupling can especially be effected through the seating devices. For this purpose an electrode is preferably provided in the seating surface, for example in the form of a conductive, flexible mesh by means of which the seat-specific signals are coupled into the respective seating place users. Through this concept child safety can especially be achieved.

It is possible to so effect a signal transfer over he seat user that the signal transfer flows from the seating location to the switch or switch surface respectively contacted. It is also possible via the switch or switching surfaces to couple a switch-specific signal into the seating location user so that over the seating surface electrode a further signal processing is carried out. Also with this system the body of the driver/seating place user forms a part of the signal transfer stretch.

FIG. 7 shows a switching device for a vehicle convertible top. The convertible top of a convertible vehicle folds and immerses itself for example at the push of a button automatically in a loading space provided therefore in the car. The required driving force of this device can be sufficient to cause a severe damage to a human hand hold there between, for example by bruising. The electrode device provided according to invention in the area of the convertible top especially in the potential gap zones can be disposed such that it does not interfere with the optical characteristics of the top.

According to invention an electrode device is provided which can be designed for example as a wire. This wire, which can be rigid or flexible depending of the design, serves as capacitive transducer. By determining its course for example by forming thereof the zone to be monitored can be defined exactly. One end of the wire is fed to an RC or LC oscillator (osc. 1) and connected to the frequency-determining condenser C1 (FIG. 1). An approach to this wire e.g. with a hand causes a slight capacitive change and hence a frequency shift. A second, stable oscillator (osc. 2) generates a frequency corresponding to the one of the first oscillator, when an approach to the wire does not take place. Both signal outputs are fed to a mixer with subsequent low pass. At its output a low frequency signal can be grabbed, which is the higher the more oscillator 1 is out-of-tune by an approach of for example a hand. With a switching described in the following it can be determined in one processing step in which direction and with which rate the hand is moved into the vicinity of the wire.

For determining of one or more switching points such as for alarming, switching-off or reactivation, the generated NF can be fed to one or more sound decoders, which switch at different frequencies. Thereby it applies that the higher the frequency the closer the approach to the wire. From the time difference between two switching points the velocity of the approach can be determined, while the sequence of the switching points gives information about the movement direction. This can be used for the activation of a RIS flip flop providing for a switching-off in the case of an approach and for a reactivation in the case of a removal of the hand out of the danger area; in the area there between an alarm signal can alert. Thereby a certain "sensible intelligence" of the sensor results in a simple way.

In FIG. 8 a second switching according to invention is represented. In this embodiment the NF generated by approach is converted into an analog voltage and fed to a multiple comparator used such as for example for LED modulation displays. Optionally a point or bar display can be used, the approach or removal of a hand can now be visualized. Grabbings for controlling can be realized through optocouplers.

In FIG. 9 a third switching variant is represented. In this further embodiment a suitable micro controller generates the fix oscillator frequency osc. 2 (PWM, or by software) and the mixed frequency is digitalized as analog voltage by means of an ADC. Switching points and outputs can be determined now by software.

In FIG. 10 a fourth switching variant is represented. In this further embodiment the complexity described in the variant 3 is reduced in that the signal attached to the low pass is attached to a pin of the micro controller through a Schmitt-trigger as rectangle. This can be programmed as frequency counter. Functions can be carried out through comparative operations. Thereby the systems gets more flexible and can adjust itself to changing environment conditions as described in the following.

A DSP as controller can also take the functions of the mixer and of the low pass to further reduce the switching complexity.

Simple Environment Analysis

Before for example a top is opened a nullification can take place to exclude a false alarm. Thereby the micro controller reduces its fix frequency generated by software or being changeable, which simulates the osc. 2 until it matches to the one of osc. 1, the mixed frequency is the zero. Thereby it runs a simple loop, such as follows:

| | |
|---|---|
| while (get_mixed frequency( ) != 0) | // the software frequency counter is read |
| fix frequency--; | // the fix frequency (osc. 2) is lowered |

Therewith influences such as changing air humidity or metallic items in the vicinity (e.g. lamp posts) can be compensated.

Complex Environment Analysis

As the exemplary convertible top interfolds with opening a change of the wire capacity is also thinkable without approach of human limbs. This change can be recorded and stored. In this way ex factory a characteristic could be recorded, which corresponds to the opening of the top in different environment conditions. Therewith an optimal detection could be attained with every opening angle. As side effect the top could close itself automatically in the case of rain or storm.

Utilization Possibilities

Whether flap reflectors, electrically lifted windows, wipers and lots more, there are many possibilities where one painfully can clamp fingers, hands, arms or other body parts. Through the formable sensor wire remedy shall be found. Instead of is a wire also a conductible foil can be used, due to the bigger surface the capacitive change is higher, what can be possibly advantageous, for example to detect seat occupancies. Dangerous machine parts and industrial robots could be also secured. The switching is superior to known capacitive sensors, used such as for example in fill level sensors, as the first work only punctually and can not secure crossing lines or definable zones.

In the following a method is presented, which realizes in an advantageous way a dialogue system, which can solve the problems given especially with respect to the fourth invention complex.

Thereby the invention uses the possibility of a capacitive transfer of data preferably via the skin of a user. As it is here in principle an alternating circuit, a change of the (e.g. ohmic) resistive load of the receiver input stage can be detected on the sender site. This change can take place in a definable rhythm (so called load telegram BT see FIG. 4).

The transmitter generates first a short (e.g. 1 ms) pilot sound in irregular intervals repetitively, e.g. 5 times per second. In the approach to the capacitive coupling position this frequency is detected by the receiver, which then immediately generates a load telegram (BT). At this the transmitter (sender) can "detect":

1. that it is in the vicinity of a receiver
2. what receiver is concerned, when the BT contains an identification
3. by which way (frequency code, key, etc.) certain data are to be transferred
4. whether the transmission is being perturbed, BT is not correctly readable due to a perturbance means.

An "overhearer" would merely be able to detect the pilot sounds, as he forms an own load circuit with respect to the transmitter (however not to the receiver). At a position remote from the receiver however merely the repetitive pilot sounds could be "wiretapped", due to the absent load telegram the transmitter "detects" that it is not located in receiver vicinity and continues to output the pilot sound cyclically.

The receiver changes with every pilot sound its load telegram. It "detects" a perturbance means at the excess length (permanent means). Would the perturbance take place cyclically, such as the pilot sounds, due to the irregular output of the "real" pilot sounds always the one or other could "slip through". A detected perturbance could trigger an alarm or initiate e.g. a locking or be signalized otherwise. As to a pilot sound the transmitter has to output an ID number coded by the load telegram, the receiver also can detect the absence of such one.

Principle of Function

An oscillator (which can be also designed as VCO) generates the transmission frequency (typically some 100 kHz). A control provides for that first the pilot sounds are outputted selectively or cyclically if necessary in irregular intervals through a mixer (ASK/FSK or the like). With the approach to a receiver this generates a load telegram (e.g. by short circuit of Rb), what results in alternating voltage drops at the resistor Rx of the transmitter. These can be fed e.g. through a differential amplifier to the control. This decodes the load telegram and correspondingly codes the code of the transmitter to be transferred. The result is again outputted through the mixer, amplified by the receiver, decoded and fed to a code evaluation. At the receiver devices or components can remain in a power saving state until a pilot sound is received. Therewith in a simple way and with a low cost a comfortable and secure dialog system with many advantages can be realized (see FIG. 5). The load of the alternating circuit can take place through the activating resp. deactivating of an ohmic resistive load and/or of a capacity and/or of a inductive impedance. The switching operation itself can take place through a transistor, FET, CMOS switch etc; an optocoupler can be used also.

A First Preferred Embodiment

Everywhere where a secure identification shall take place within an action (action-integrated identification), one or more code transmitters can be accommodated with one user in the body vicinity. This can take place in a manifold way, e.g. chip cards or key-ring pendants, trinkets or cloth items or other entrained item (wallets, billfolds) can contain transmitters. With the approach of a user e.g. with its hand to a receiver the quasi bidirectional dialog takes place, as an alternating circuit with capacitive coupling surfaces results. After the transmission of identifying data the receiver at correspondence with it can output a signal, which effects e.g. an electromagnetic locking device for opening a (door) lock. While the action to be identified takes place, in the rhythm of the pilot sounds permanently a new dialogue is conducted with different load telegrams. A removal from the receiver causes it to automatically output a lock impulse, which can be used internally and externally. Keyless access systems obtain therewith a new quality, as the capacitive method operates between two surfaces approaching to each other and does not require a (wire-tapable) radio area. Moreover the rule of thumb applies, that when a transmitter can detect and decode a load telegram the transmission quality (quality of service) of the capacitive coupling surface is sufficient for a secure data transfer on the transmitter site. We want to refer to this process as "sensible intelligence". On this basis an action-integrated identification can be newly defined:

1. Intention of a user equipped with at least one code transmitter to carry out an identifiable action (e.g. opening of a locked door).
2. Approach (e.g. with the hand) to the coupling surface of a receiver, therewith building of an alternating circuit; the feed-back takes place through parasitic capacities.
3. Receiver "detects" the irregular pilot sounds.
4. It generates a load telegram through impedance change of the input stage in a random but reasonable rhythm.
5. The transmitter decodes from the load telegram BT an action command.
6. Therewith it codes its identification data and selects e.g. a transmission frequency, baud rate and the transmission method (e.g. ASK, FSK etc.) (see FIG. 6).
7. The transmitter outputs the coded signals and generates then again a pilot sound.
8. The receiver amplifies and decodes the transmitter signals.
9. With correspondence of a certain code sequence an impulse is output, e.g. for opening of a locking mechanism (possibly through a control).
10. With the next pilot sound it gives to the receiver an "OK" message and further information about a new load telegram. In the load telegram informations can be contained, which originate from the code transmitter or which were effected by it.
11. When the user moves away, the dialogue is stopped. The transmitter generates then only just pilot sounds and the receiver reports the distance (e.g. locking command).
12. In the mean time transmitter and receiver "evaluate" their environment permanently for perturbances.

With the irregular output of pilot sounds collisions shall be largely prevented in the use of several transmitters. Thereby the distance of the frequency output (burst) shall consist of a fix and at least a random time part, which may not exceed a certain duration (so called dirty burst).

Example of a generation of "dirty bursts" in the programming language "C", wherein it is supposed, that the transmitter meets its functions through a micro controller (or a comparable logic):

| While(1) | // main loop |
|---|---|
| { | |
| A=50 | // fix burst part in ms |
| B=RND(50) | // variable burst part is formed through random function RND |
| Sleep(A+B) | // power saving state (burst) |
| Pilot(1) | // after the "wake up" the pilot sound is sent out, and a possible load telegram is checked |
| check_BT( ) | |

Further Exemplary Uses

Additionally to data to be identified data detected by sensors can be transferred to the receiver. For example in medical technology it is possible to digitalize bioelectric data (EEG, EMG, EKG etc.) as well as pulse, temperature(s), respiration, pressures (blood, swellings etc.) and e.g. to store them temporarily (logger) in the transmitter. With approach to a receiver it can e.g. select sensors through the BT or read out the temporary memory (flush). The transmitter can be designed also as a type of electronic plaster, which is adhered to a body site to be examined. The receiver can trigger through its load telegram also stimulations (e.g. electrical impulses).

An adverse effect of the patient by means of radio waves does not take place. The data transfer is carried out over the skin, not through the body and its cells.

Electrically fireable weapons can be operated user-dependently (so called smart guns), when such a weapon is equipped with a receiver. In the load telegram also data about the ammunition content (e.g. through digitalizing of the spring load of the magazine) and about the usage property can be contained. The weapon works only, when the user carries an authorized transmitter and keeps the weapon with his own hands. This can prevent accidents (e.g. with children) or abuse.

A further reasonable use could be the one of an electronic ticket. Thereby the transmitter can have data in a non volatile memory, which give information about e.g. the use (validity, price category, seat status etc.). With entering a billable institution (cinema, theater, sport or leisure time site, public traffic means etc.) through the load telegram of a receiver disposed at the entrance (e.g. with coupling foil in the ground) direct debiting can be made, header data (e.g. displaying the seat position etc.) can be given or other data can be transferred.

The quasi unidirectional dialogue system can be used everywhere more comfortably and cheaper, where until now other wireless technologies (radio, transponder, IR light etc.) were used and which whether passed on a dialogue and/or could be realized with significant costs and/or security risks. A combination of the different technologies is possible, e.g. to make them more secure or more comfortable.

Through an easy realizable rhythmic change of the input impedance of the receiver the transmitter obtains information. This is only possible in an alternating circuit, how it preferably results in with capacitive data transfer. A dialogue can take place, as the transmitter with its frequent pilot signal supplies the carrier for the load telegram of the receiver, what in principle represents an amplitude modulation. With constant output level the pilot sound is not loaded, the rhythmic load is rather to be detected in the parasitic feed-back circuit. This in turn complicates the unauthorized wiretapping of the load telegram BT.

The invention makes bidirectional data transfer systems easier and cheaper and enables an action-integrated identification of a user. Therewith the system can be used preferably in "Personal Area Networks" (PAN). Moreover it can complement existing technologies in comfort and/or security factors.

As seen from FIG. 18, different electrodes, especially foil segments, can be successively coupled to a receiver through a multiplexer. Therewith the disposition of one (or more) transmitter(s) in the vehicle, or if necessary the location of a driver, can be detected and displayed. Touch points can be located for example in seat and deposition surfaces (trunk, dashboard, central console etc.), door bars in the interior, as well as door and hood grips in the exterior.

The invention claimed is:

1. A method for the controlling of a plurality of switches each capable of generating a respective device-specific control signal, the method comprising the step of:
providing a device comprising a first conductive surface and establishing through said first conductive surface a first capacitive coupling with a first body part of a user;
providing in said device a plurality of electrically insulated function switch units each comprising a respective capacitive touch button operable to establish a respective second capacitive coupling between an associated switch unit and a second body part of the user wherein the first capacitive coupling is arranged remote from the second capacitive couplings and a body of the user bridges the first and second capacitive coupling of the device when the second body part of the user is in proximity to the capacitive touch button;
generating an alternating-current and feeding the alternating-current to a second conductive surface of the device wherein the second conductive surface is operable to establish a plurality of third capacitive couplings with said plurality of electrically isolated function switch units, wherein each function switch unit individually modulates the alternating-current to generate an electric field through the respective second capacitive coupling which is applied to the second body part of the user as a unidirectional signal in proximity to the respective second capacitive coupling;
and wherein a signal generated by modulating the alternating current is received at the first conductive surface through the body when the second body part of the user is in proximity to the capacitive touch button; and
decoding the received signal in said device to control a function defined by the respective function switch unit.

2. The method defined in claim 1, wherein the device is a motor vehicle.

3. The method defined in claim 2, wherein a plurality of first conductive surfaces are arranged in seats of said motor vehicle.

4. The method defined in claim 1, wherein each function switch unit comprises a register with an identification number and wherein the method further comprises to bit-wise feed an electronic switch with said identification number in the function switch unit to vary the loading of the alternating-current.

5. The method defined in claim 4, wherein a plurality of first conductive surfaces are arranged in seats of said motor vehicle and wherein each seat is associated with a respective receiver to decode function signals received by an associated first capacitive coupling.

6. The method defined in claim 5, wherein each function switch unit is powered rectifying a current of the received signal and charging a power supply capacitor with the rectified current.

7. The method defined in claim 6, wherein the second conductive surface is formed by a conductive foil and the function switch units are arranged above said foil and are capacitively coupled with said foil.

8. A device comprising a plurality of switches each capable of generating a respective device-specific control signal, the device comprising:
a first conductive surface configured to establish through said first conductive surface a first capacitive coupling with a first body part of a user and a plurality of electrically insulated function switch units each comprising a respective capacitive touch button operable to establish a respective second capacitive coupling between an associated switch unit and a second body part of the user wherein the first capacitive coupling is arranged remote from the second capacitive couplings and a body of the user bridges the first and second capacitive coupling of the device when the second body part of the user is in proximity to the capacitive touch button;
a control unit operable to generate an alternating-current and to feed the alternating-current to a second conductive surface of the device, wherein the second conductive surface is operable to establish a plurality of third capacitive couplings with said plurality of electrically insulated function switch units, wherein each function switch unit individually modulates the alternating-current to generate an electric field through the respective second capacitive coupling which is applied to the second body part of the user as a unidirectional signal in proximity to the respective second capacitive coupling;

and wherein when the second body part of the user is approximate the first capacitive coupling a signal is transmitted through the body by the respective second capacitive coupling and received by the first capacitive coupling and the control unit decodes the received signal to control a function of the device defined by the respective function switch unit.

9. The device according to claim 8, wherein the device is a motor vehicle.

10. The device according to claim 9, wherein a plurality of first conductive surfaces are arranged in seats of said motor vehicle.

11. The device according to claim 8, wherein each function switch unit comprises a register with an identification number and wherein the method further comprises to bit-wise feed an electronic switch in the function switch unit said identification number to vary the loading of the alternating-current.

12. The device according to claim 11, wherein each function switch unit is capacitively coupled with said control unit through a conductive foil.

13. The device according to claim 12, wherein each function switch unit comprises a rectifier and storage capacitor for storing a DC operating voltage derived from said alternating current.

* * * * *